United States Patent
Jagusch

(10) Patent No.: US 7,182,686 B2
(45) Date of Patent: Feb. 27, 2007

(54) BACON HANGER

(75) Inventor: Wayne E. Jagusch, Arlington Heights, IL (US)

(73) Assignee: Beacon Inc., Hillside, IL (US)

( * ) Notice: Subject to any disclaimer, the term of this patent is extended or adjusted under 35 U.S.C. 154(b) by 0 days.

(21) Appl. No.: 11/235,455

(22) Filed: Sep. 21, 2005

(65) Prior Publication Data

US 2006/0099901 A1     May 11, 2006

Related U.S. Application Data

(63) Continuation of application No. 10/965,427, filed on Oct. 14, 2004, now abandoned.

(51) Int. Cl.
*A22C 18/00* (2006.01)

(52) U.S. Cl. ..................................... 452/193

(58) Field of Classification Search ...................... None
See application file for complete search history.

(56) References Cited

U.S. PATENT DOCUMENTS

| | | | |
|---|---|---|---|
| 974,200 A * | 11/1910 | Skewer | 452/193 |
| 979,945 A * | 12/1910 | Harnischfeger | 452/193 |
| 998,286 A * | 7/1911 | Fisher | 452/193 |
| 1,006,007 A * | 10/1911 | Rispel | 452/193 |
| 1,058,387 A * | 4/1913 | Rastman | 452/193 |
| 1,794,304 A * | 2/1931 | Koch | 99/350 |
| 1,825,879 A * | 10/1931 | Louthian | 452/193 |
| 1,870,729 A * | 8/1932 | Hulseberg | 211/85.3 |
| 1,915,293 A * | 6/1933 | Covey | 452/193 |
| 3,090,990 A * | 5/1963 | Graper | 452/193 |
| 4,172,305 A * | 10/1979 | Henebry et al. | 452/193 |
| 5,423,721 A | 6/1995 | Roush et al. | |
| 5,938,522 A * | 8/1999 | Jagusch et al. | 452/193 |
| 6,506,108 B1 * | 1/2003 | Jagusch | 452/193 |

* cited by examiner

*Primary Examiner*—Thomas Price
(74) *Attorney, Agent, or Firm*—McAndrews, Held & Malloy, Ltd.

(57) ABSTRACT

A hanger designed for supporting pork bellies during handling and processing into slabs of bacon characterized by support member, a force distributing strut member and a generally rectangular base frame with a top bar and a bottom bar, and a series of generally L-shaped prong members attached to the base frame and defining a prong assembly extending laterally from the base frame. The prong members are attached to the bottom bar opposite the side of the prong assembly. The force is distributed in the hanger structure from the support member to the base frame by a generally vertical force distributing rod connecting the base frame and the support member.

19 Claims, 5 Drawing Sheets

US 7,182,686 B2

BACON HANGER

CROSS-REFERENCE TO RELATED APPLICATION

This present application relates to, and claims priority from, as a continuation of U.S. application Ser. No. 10/965,427 filed on Oct. 14, 2004, now abandoned and entitled "Bacon Hanger."

STATEMENT REGARDING FEDERALLY SPONSORED RESEARCH OR DEVELOPMENT

None.

BACKGROUND OF THE INVENTION

This invention relates to equipment for supporting and handling articles, particularly meat products, in manufacturing and processing operations and is more particularly concerned with improvements in bacon hangers or combs for supporting pork bellies during processing to form slabs of bacon.

In the slaughtering or butchering of hogs the various portions or cuts into which the animal carcass is divided are prepared for marketing by meat packers and processors according to the type of cut and the form in which it is desired to present it to the consumer. Generally, cuts known as pork bellies are processed by suspending them for a predetermined time in a processing area, such as a smoke house, or similar curing area, where they are converted into slabs of bacon which may be supplied to the consumer in a solid piece or cut into slices after sizing and packaged to provide the familiar sliced bacon package.

In the conventional butchering and processing operation, pork bellies are transported from the butchering or cutting area to an area where they are located on bacon hangers, which serve to support the bellies on a tree or rack while they are being processed. When the processing or curing is completed, the bacon slabs are removed from the hangers enabling reuse of the latter.

The bacon hangers which have been provided heretofore have been formed with pointed prongs or teeth arranged as in a comb and mounted on a frame depending from a bracket member which is shaped or otherwise formed for engaging an overhead rail, track bar, smokestick or the like. Generally, the hangers have been constructed so that the hanger teeth or prongs can be readily inserted into the relatively soft area along the top ends of the bellies by holding the bellies and pressing the teeth into the same, with some portion of the frame serving as a handle for gripping it while guiding the teeth into the meat. During processing of the slab, the processing equipment together with the transportation of the bacon slab from place to place cause the bacon slab to swing back and forth. This swinging of the slab results in bending forces that are concentrated in the hook section of the structure. The bending forces cause hardening of the hook shaft and subsequent structural failure of the hanger.

SUMMARY OF THE INVENTION

It is a general object of the present invention to provide an improved structure for use in handling cuts of meat, particularly pork bellies, following butchering operations and during subsequent handling and processing operations.

It is a more specific object of the invention to provide a bacon hanger that is specially adapted with a force distributing strut member such that the force distributing strut member distributes the forces and stresses encountered by the hanger during typical processing of a pork belly or meat product. By distributing the forces, the present invention prevents localized concentration of forces and stresses caused by swinging meat cuts during processing and transportation of the meat and the subsequent failure of the hanger structure.

Another object of the invention to provide a new and improved hanger structure that is especially adapted for suspending pork bellies and removal of the hanger from the bellies so as to facilitate handling, storage, retrieval and processing to convert the bellies into slabs of bacon.

The invention as disclosed and claimed herein comprises a typical bacon hanger which will generally include a support member supporting an elongate support frame adapted to be disposed in a generally vertical plane, a plurality of spaced article engaging prongs extending generally normal to the plane of the frame, and a force distributing strut member connected between the support member and the support frame. Examples of typical bacon hangers are disclosed in U.S. Pat. Nos. 5,938,522 and 6,506,108, which are hereby incorporated by reference. The force distributing strut member is characterized by a member preferably welded on the prong side of the hanger connecting the upper section of the support member to the support frame.

The aforesaid and other objects and advantages of the invention will become more apparent upon consideration of the preferred form of the hanger structure which is illustrated in the accompanying drawings wherein like parts are identified by the same numerals throughout the views.

DESCRIPTION OF THE PREFERRED EMBODIMENT OF THE INVENTION

Figure 1:
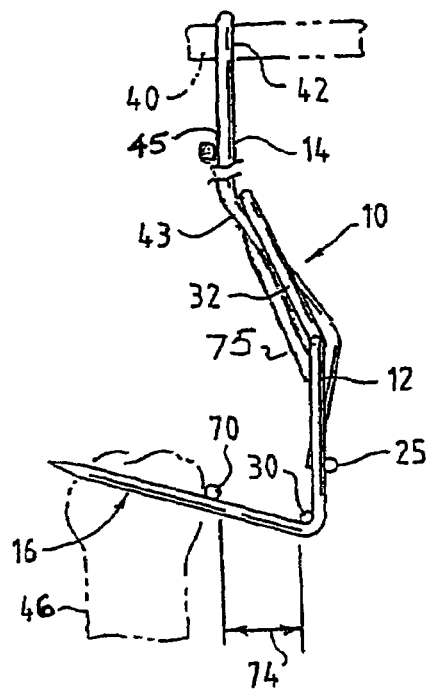
FIG. 1 is an end view of a hanger structure which is particularly adapted for use in suspending cuts of meat in a processing area with the hanger being shown in the position it will assume when mounted on an overhead support bar or rack member.

As illustrated in the drawings, the hanger 10 is designed particularly for use in suspending pork bellies for transportation and during processing or curing, such as a smoke house, cooking oven or cooling area. The hanger is designed so that it may be hung on a tree, on a truck, rail or rack and moved to or through the processing area or system where it may be supported in the same manner or carried on a conveyor, or the like, during the processing and subsequent handling.

To the extent that the hangers depicted in the accompanying figures retain common or comparable elements from figure to figure, the same reference numerals will be applied to such elements, which will not always be separately explained for such figure.

Figure 2:
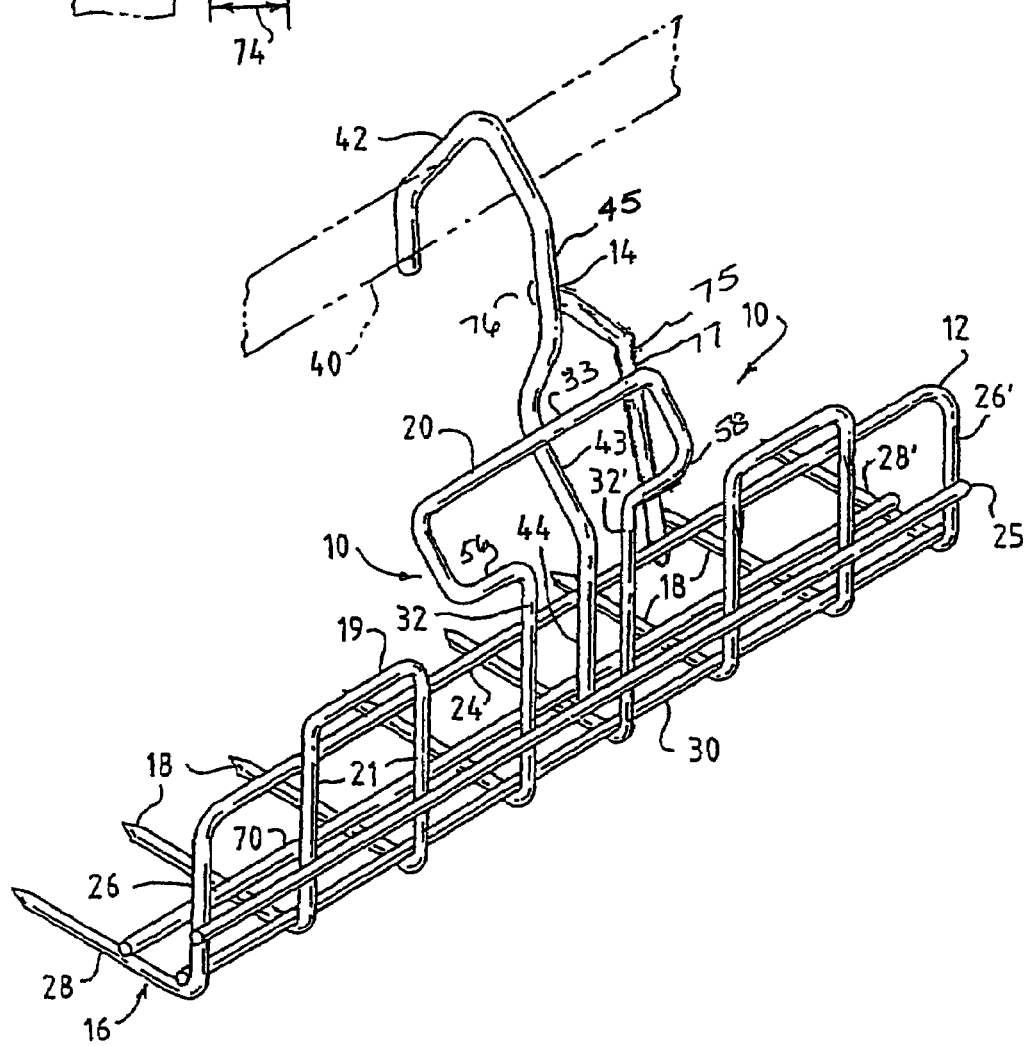
FIG. 2 is a perspective view of the hanger structure of FIG. 1 showing the spaced relationship between the spaced cross bar and the force distributing strut member.

Referring to FIGS. 1 and 2, the hanger 10 of the present invention comprises an elongate supporting frame 12 which is secured in vertically disposed depending relation on a hook-forming bracket 14 and which carries a prong assembly 16 of meat engaging prongs 18, which are arranged after the fashion of teeth in a comb, and which extend in a common plane in a generally normal direction from one side of the vertical support frame 12 and along the bottom thereof. In addition to the hook-forming bracket 14, the support frame 12 may be provided with a hand-gripping member 20 extending above the top of the support frame 12 and in a plane inclined from the plane of the support frame 12 and slightly in the direction of the prong assembly 16. Connected between the hook-forming bracket 14 and the support frame 12 is a force distributing strut member 75 which is preferably attached on the prong side of the upper portion 45 of the hook-forming bracket 14 and to prong side of the support frame 12. The support frame 12 includes a crossbar 25 that is attached to the backside of leg formations 26, 26' at about their midpoint and a bottom-gripping member 30 that is attached to the front side of the leg formations 26, 26' at their lower end.

The prong assembly 16 includes a spacing cross bar 70 attached to the topside of the prongs 18 and spaced from the bottom gripping member 30 to create a space 74. The spaced cross bar 70 controls the extent to which the prongs 18 are inserted into the pork belly 46. When the pork belly 46 is mounted on the prong assembly 16 of the hanger 10, the space 74 provides an opening that may be engaged by a mechanical device (not shown) often used in removing a bacon hanger 10 from a processed pork belly 46.

The several elements of the hanger structure 10 in the form illustrated are fabricated from lengths of metal rod material, of suitable gauge, which are bent as shown and joined or connected by welding, or secured to each other in a similar manner. Preferably, the rod or bar material will be stainless steel to afford the most desirable sanitation before use.

The elongate support frame 12 may be formed by bending a length of rod stock into a U-shape so as to form a relatively long bight portion, which serves as the top bar 24 of the support frame 12, and leg formations 26, 26' which are further bent intermediate their ends so as to provide the end prongs 28, 28' in the prong assembly 16. The end prongs 28, 28' extend in a plane at an angle slightly less than normal to the plane of the support frame 12 as best seen in FIG. 1. The crossbar 25 and the bottom gripping member 30 connect the two leg formations 26, 26' and are in spaced parallel relation below the top bar 24 so as to form the generally rectangular frame support for the meat engaging prong assembly 16.

The prongs 18 intermediate the two end prongs 28, 28' are formed in pairs and attached to the support frame 12. Each pair thereof is formed from a section or length of rod or bar stock by bending it into U-shape to provide a bight portion 19 and spaced parallel leg formations 21. The leg formations 21 are further bent intermediate their ends to provide a pair of prongs 18. The prongs 18 extend in a plane at an angle to the plane of the balance of the member which is secured on the support frame 12 so that portions of the legs formations 21 adjoining the bight portion 19 span the area from the top bar 24, the crossbar 25, and the bottom gripping member 30 of the support frame 12. The leg formations 21 are preferably attached to the backside of the top bar 24, the prong side of crossbar 25, and the backside of the bottom gripping member 30 enabling a structure in which the welds of the legs of the support frame 12 and the leg formations 21 of the prong assembly are under compression while supporting the weight of the pork belly 46, shown in phantom, and the welds of the gripping members 30 are under compression when the hanger 10 is being extracted from the belly 46 by a mechanical device.

The grip or handle 20 is formed by bending a section or length of bar or rod material into a U-shaped configuration with spaced apart leg formations 32, 32'. The leg formations 32, 32' are provided with inwardly extending segments 56, 58. The leg formations 32, 32' are further bent to provide a pair of the prongs 18 and the assembly is mounted on the frame bars or rods 24, 25, 30. Specifically, the leg formations 32, 32' are attached to the backside of top bar 24, the prong side of the crossbar 25 and the backside of the bottom-gripping member 30. The bight portion 33 which forms the grip or handle 20 is spaced above the top frame bar 24 a sufficient distance to accommodate the fingers in grasping the same and may be bent out of the plane of the frame 12, as shown, in the direction of the prong assembly 16 to provide a better balance in handling. The leg formations 32, 32' may also be bent at intermediate points to provide the desired distance between the resulting prongs.

The bottom-gripping member 30 is welded to the prong side of leg formations 26, 26', 32, 32' and the U-shaped members that form the remaining prongs 18. The bottom-gripping member 30 is welded at or near the point where the leg formations 26, 26', 32, 32' and the U-shaped members bend from the vertical to the horizontal. As noted above, a mechanical gripping device (not shown) may engage the space 74 defined between the bottom gripping bar 30 and the spacing bar 70 to pull the hanger 10 away from the pork belly, shown in phantom at 46, thereby eliminating the need for direct human grasping of the hanger and working the hanger out of the pork belly 46 protecting the integrity of the hanger and protecting the worker from injury.

The hook-forming bracket 14, which is provided to mount the support frame 12 on a rack or support bar, indicated in phantom line at 40, is formed from a length or section of bar or rod stock which is best shown to provide a downwardly opening hook 42 at the top and a straight terminal end section 44 for spanning the space between the top bar 24 and crossbar 25 with an intermediate portion 43 bent to position the hook 42 in a vertical plane offset from the plane of the frame 12 for better balance in handling. The upper portion 45 connects the hook 42 to the intermediate portion 43. The intermediate portion 43 is preferably attached to the prong side of bight portion 33 of hand-gripping member 20 and the backside of the bight portion 24 of the support frame 12. The end section 44 is preferably attached to the prong side of crossbar 25. Thus, all weld intersections are preferably under compression while supporting the weight of the pork belly 46

In the form shown in FIG. 2, the angle of the prongs 18 relative to the angle of the hook 42 is so determined to have the prongs in a plane at a slight angle above horizontal. When a belly is on the hanger this eliminates the possibility of the belly slipping off the hanger.

In using the hanger 10, one or more pork bellies 46 may be suspended depending upon their size relative to the size of the hanger 10. The prong assembly 16 may be conveniently engaged in the top marginal portion of the meat while the user grasps the hanger grip member 20. When the withdrawal of the prong assembly 16 is desired it is facilitated by utilizing a mechanical gripping device (not shown) to engage the space 74 and pull in the direction away from the pork belly 46 thereby exerting a direct withdrawal force substantially in the plane of the prong assembly 16.

When the bacon hanger 10 is not in use, it can be easily stored stacked or nested with other bacon hangers. The elimination of any rearside offsets, as provided in the prior art, in combination with the space 74 permits such easy storage while still accommodating the latch of a mechanical device for removing the belly from the hanger 10.

The force distributing strut member 75, which is provided to transmit the forces between the support frame 12 and the hook-forming bracket 14 is preferably formed from a length or section of bar or rod stock. The force distributing strut member 75 preferably attaches on the prong side of the hanger 10. The force distributing strut member 75 has a first end 76, an intermediate portion 77 and a second end 78. The first end 76 of the force distributing strut member 75 is preferably attached to the prong side of the upper portion 45 of the hook forming bracket 14 at a location above the point where the intermediate portion 43 of the hook forming bracket 42 is attached to the bight portion 33 of the grip or handle 20. The intermediate portion 77 of the force distribution member 75 is preferably attached to the bight portion 33 of the grip or handle 20. The force distributing strut member 75 then extends in a downwardly direction away from the opening hook 42. The intermediate portion 77 of the force distributing strut member 75 preferably attaches to the prong side of the bight portion 33 of the grip or handle 20. The force distributing strut member 75 continues in a downwardly direction away from the opening hook 42 and the second end 78 of the force distributing strut member 75 preferably attaches to the of support frame 12.

Figure 3:
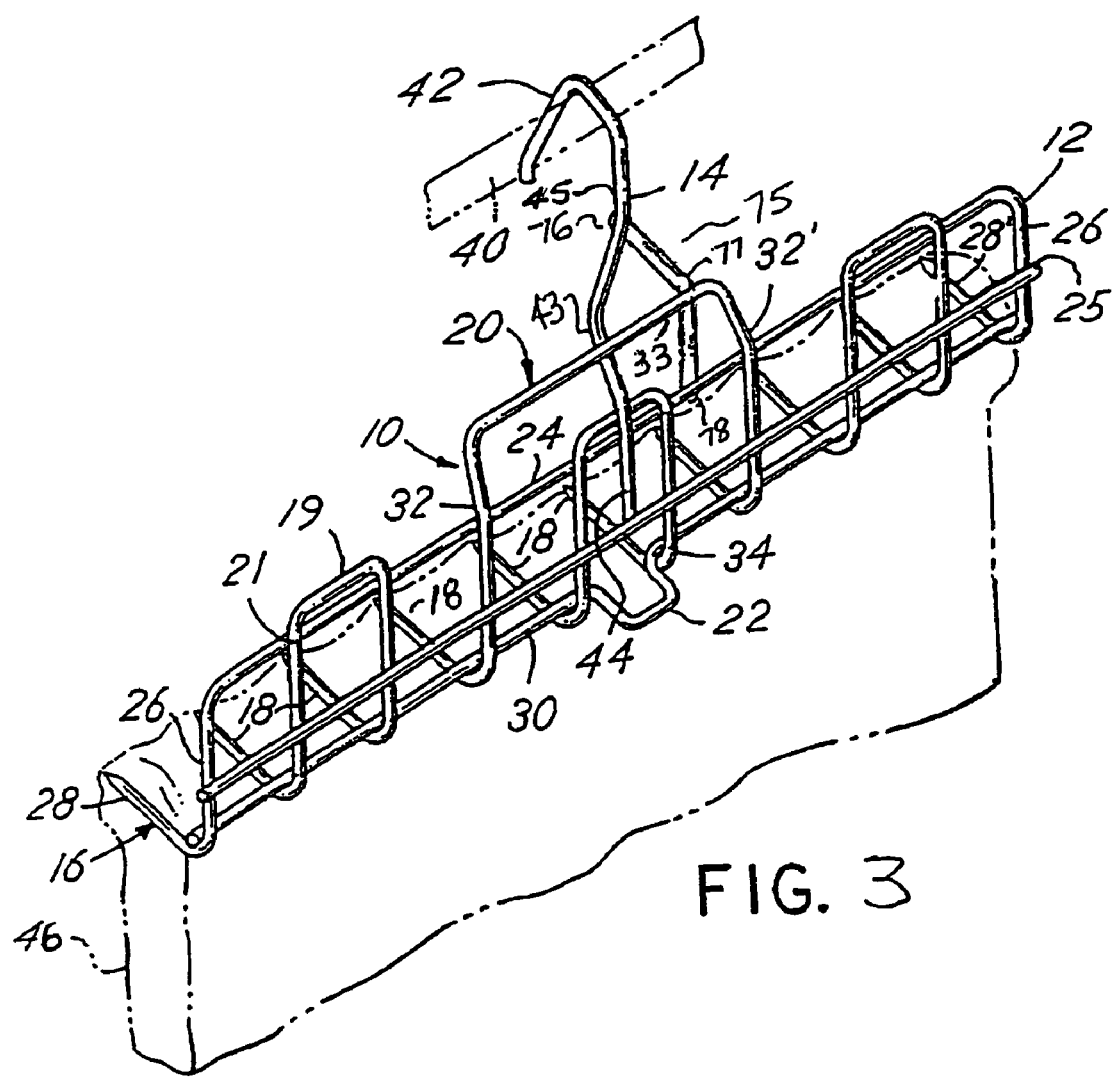
FIG. 3 is a perspective view of another embodiment of the hanger structure of the present invention

FIG. 3 shows a second embodiment of the present invention. The hanger 10 of FIG. 3 is similar to that of FIG. 2, one difference being that the bottom gripping member 30 includes an offset 22. Also, FIG. 3. shows an embodiment that eliminates the spacing crossbar 70 and the grip or handle 20 is configured to accommodate yet another set of prongs 18 between its leg formations 32, 32'.

Figure 4:
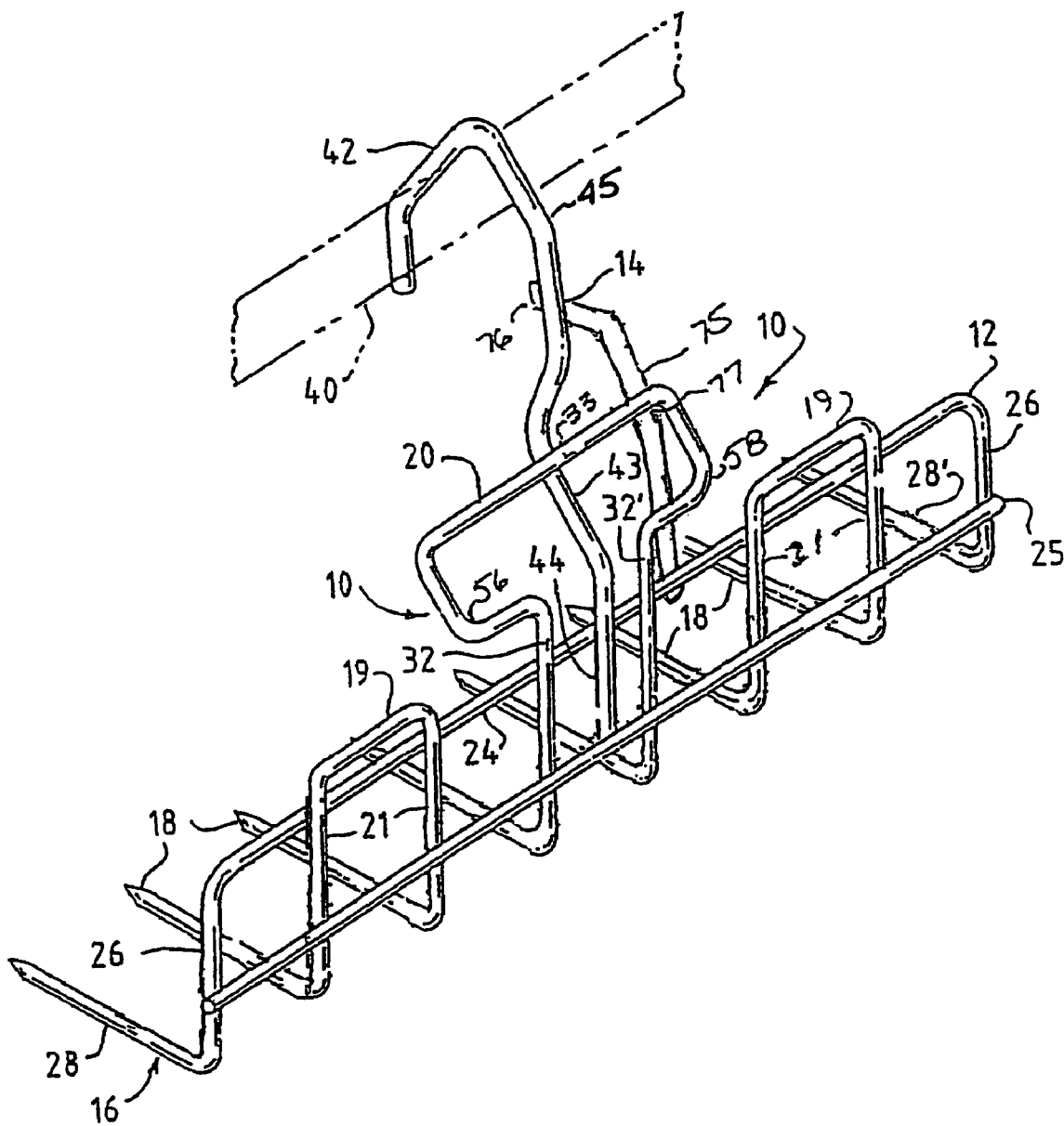
FIG. 4 is a perspective view of another embodiment of the hanger structure of the present invention.

FIG. 4 shows a third embodiment of the present invention. The hanger 10 of FIG. 4 is similar to FIG. 2, the difference being that bottom gripping member 30 and spacing crossbar 70 are eliminated.

Figure 5:
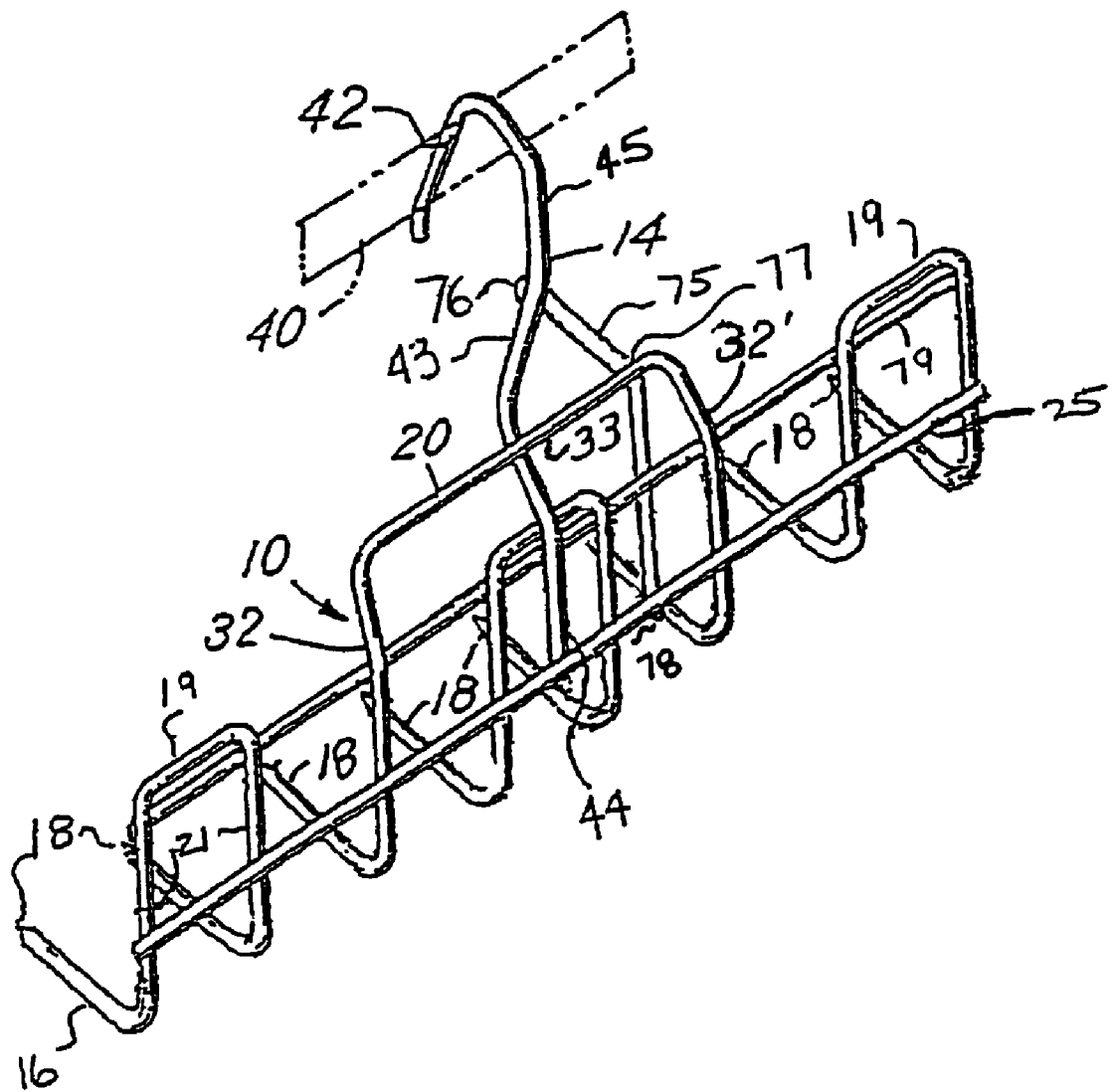
FIG. 5 is a perspective view of another embodiment of the hanger structure of the present invention.

FIG. 5 shows a fourth embodiment of the present invention. The hanger 10 of FIG. 5 is similar to FIG. 4, one difference being that the top frame bar 79 replaces the top bar 24 of the support frame shown in FIG. 4. The grip or handle 20 may be formed by bending a section or length of bar or rod material into a U-shaped configuration with spaced apart leg formations 32, 32' which are further bent to provide a pair of the prongs 18 and the assembly is mounted on the frame bars or rods 25 and 79. Specifically, the leg formations 32, 32' are attached to the backside of the top frame bar 79 and the prong side of the crossbar 25. The bight portion 33 of the grip or handle 20 is spaced above the top frame bar 79 a sufficient distance to accommodate the fingers in grasping the same and may be bent out of the plane of the frame consisting of top frame bar 79 and crossbar 25, as shown, in the direction of the prong assembly 16 to provide a better balance in handling. The leg formations 32, 32' may also be bent at intermediate points to provide the desired distance between the resulting prongs.

In between and on either side of the two leg formations 32, 32' are prongs 18 formed in pairs and attached to the top frame bar 79 and crossbar 25. Each pair of prongs 18 is formed from a section or length of rod or bar stock by bending it into U-shape to provide a bight portion 19 and spaced parallel leg formations 21. The leg formations 21 are further bent intermediate their ends to provide a pair of prongs 18. The prongs 18 extend in a plane at an angle to the plane of the balance of the member which is secured on the frame bar 79 so that portions of the leg formations 21 adjoining the bight portion 19 span the area from the top frame bar 79 and the crossbar 25. The leg formations 21 are preferably attached to the backside of the top frame bar 79 and the prong side of the crossbar 25.

The hook-forming bracket 14, which is provided to mount the support top frame bar 79 and crossbar 25 from a rack or support bar as indicated in phantom line at 40, is formed from a length or section of bar or rod stock which is best shown to provide a downwardly opening hook 42 at the top and a straight terminal end section 44 for spanning the space between the top bar 79 and crossbar 25 with an intermediate portion 43 bent to position the hook 42 in a vertical plane offset from the plane of the frame bar 79 for better balance in handling. The upper portion 45 connects the hook 42 to the intermediate portion 43. The intermediate portion 43 is preferably attached to the prong side of bight portion 33 of hand-gripping member 20 and the backside of the bight portion 19 of the U-shaped prongs 18. The end section 44 is preferably attached to the prong side of crossbar 25.

The force distributing strut member 75, which is provided to transmit the forces from the hook-forming bracket 14 to the frame bar 79 and the grip or handle 20, is preferably formed from a length or section of bar or rod stock. The force distributing strut member 75 preferably attaches on the prong side of hanger 10. The force distributing strut member 75 has a first end 76, an intermediate portion 77 and a second end 78. The first end 76 of the force distributing strut member 75 is preferably attached to the prong side of the upper portion 45 of the hook forming bracket 14 at a location above the point where the intermediate portion 43 is attached to the bight portion 33 of the grip or handle 20. The intermediate portion 77 of the force distribution member 75 is preferably attached to the bight portion 33 of the grip or handle 20. The force distributing strut member 75 then extends in a downwardly direction away from the opening hook 42. The intermediate portion 77 of the force distributing strut member 75 preferably attaches to the prong side of the bright portion 33 of the grip or handle 20. The force distributing strut member 75 continues in a downwardly direction away from the opening hook 42 and the second end 78 of the force distributing strut member 75 preferably attaches to the top frame bar 79 on the prong side.

Figure 6:
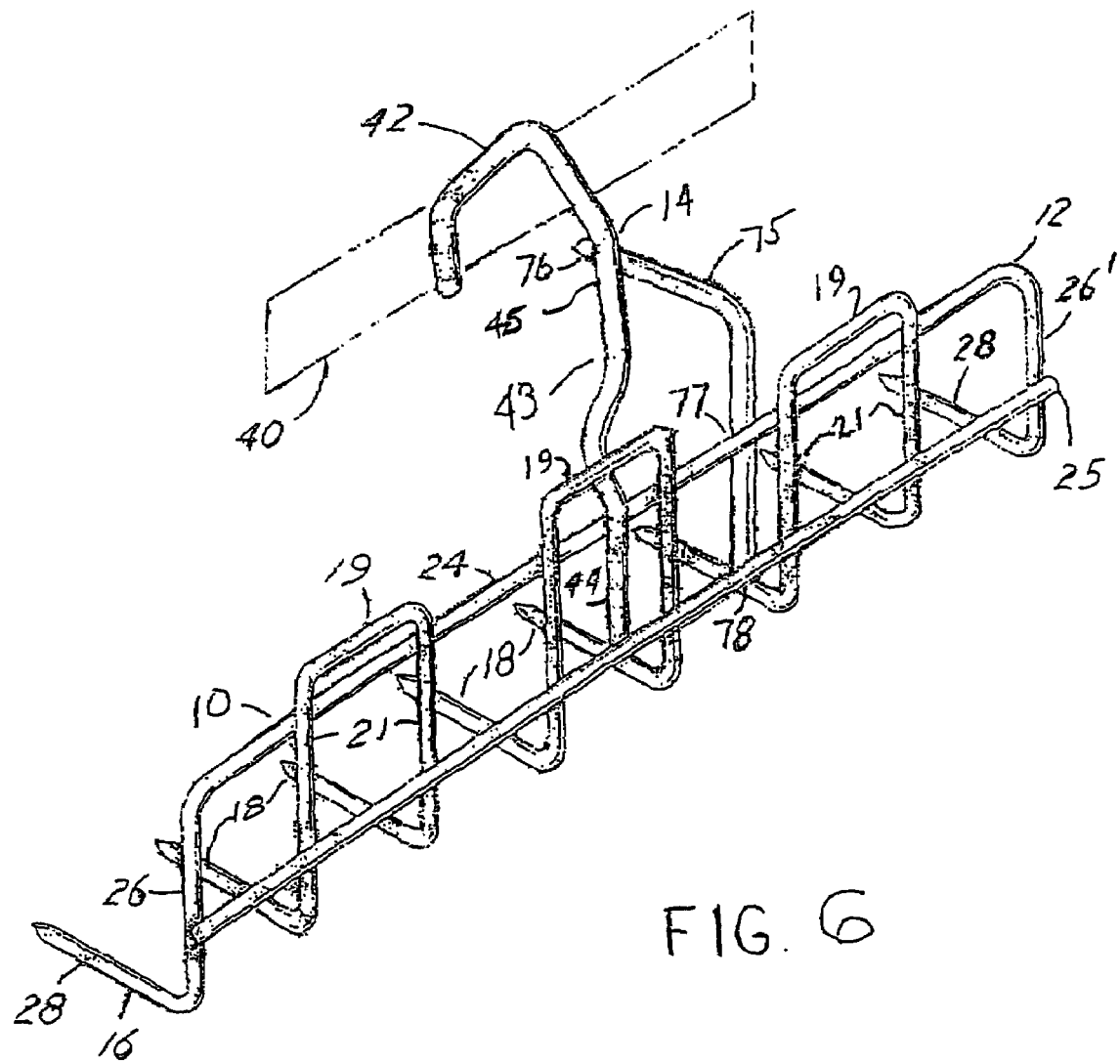
FIG. 6 is a perspective view of another embodiment of the hanger structure of the present invention.

FIG. 6 shows a fifth embodiment of the present invention. The hanger 10 of FIG. 6 is similar to FIG. 4, one difference being that the grip or handle 20 is eliminated and replaced with a U shaped prong 18.

Additionally, FIG. 6 shows an embodiment where the intermediate portion 43 of the hook-forming bracket 14 is preferably attached to the prong side of the bight portion 19 of the U-shaped prong 18. The end section 44 of the hook forming bracket 14 is preferably attached to the backside of support frame 12 and the prong side of crossbar 25.

Further, FIG. 6 shows an embodiment with the first end 76 of the force distributing strut member 75 preferably attached to the prong side of the intermediate portion 43 of the hook forming bracket 14 at a location above the point where the upper portion 45 is attached to the bight portion 19 of the U shaped prong 18. The force distributing strut member 75 then extends in a downwardly direction away from the opening hook 42. The intermediate portion 77 of the force distributing strut member 75 preferably attaches to the prong side of the bright portion 24 of the support frame 12. The force distributing strut member 75 continues in a downwardly direction away from the opening hook 42 and the second end 78 of the force distributing strut member 75 preferably attaches to the crossbar 25 on the prong side. In sum, those skilled in the art will understand that the force distributing strut member may be utilized with any prior art bacon hanger configuration.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A hanger structure adapted for suspending a meat product during processing comprising: a hook forming bracket that includes a hook, an upper portion, a middle portion and an end portion adapted to engage an overhead structure and having a prong-side; a base frame depending from the hook forming bracket, the base frame having a prong-side and a backside; a prong assembly extending from the prong-side of the base frame; a support frame; and a force distributing strut member having first and second ends and an second intermediate portion, the first end being attached to the upper portion of the hook forming bracket, and the second end attached to the base frame to distribute forces.

2. The hanger structure of claim 1 wherein the first end of the force distributing strut member attaches to the prong side of the upper portion of the hook forming bracket and the second end attaches to the prong side of the base frame.

3. The hanger structure of claim 1 wherein the base frame comprises a plurality of bar members disposed generally parallel to the common lateral plane of the prongs.

4. The hanger structure of claim 1 wherein the prong assembly comprises prongs arranged in pairs and the pairs of prongs are formed as terminal end sections of U-shaped rod members which have leg portions constituting a part of the base frame with the terminal end sections being bent at an angle to the plane of the base frame whereby the prongs extend in a common lateral plane.

5. The hanger structure in claim 1 wherein the hanger structure further includes a gripping member in the form of an inverted "U" shape having a bight portion and spaced leg portions each having an angled intermediate section, a terminal end section, and a prong, the prong extending laterally from the meatside of the base frame.

6. The hanger structure in claim 1 wherein the intermediate portion of the hook forming bracket is connected to the bight portion of the gripping member.

7. The hanger section in claim 1 wherein the second intermediate portion of the force distribution member attaches to the bight portion of the gripping member.

8. In an improved hanger structure adapted for suspending a meat product during processing, the hanger structure having a hook forming bracket adapted to engage an overhead structure, the hook forming bracket includes a hook, an upper portion, a middle portion and an end portion having a prong-side, the hanger structure further having a base frame, with a prong side and a backside, and a prong assembly extending from the prong-side of the base frame, the improvement comprising: a force distributing strut member attaching the upper portion of the hook forming bracket to the base frame to distribute forces.

9. The hanger structure of claim 8 wherein the prong assembly comprises prongs arranged in pairs and the pairs of prongs are formed as terminal end sections of U-shaped rod members which have leg portions constituting a part of the base frame with the terminal end sections being bent at an angle to the plane of the base frame whereby the prongs extend in a common lateral plane.

10. The hanger structure of claim 8 wherein the base frame comprises a plurality of bar members disposed generally parallel to the common lateral plane of the prongs.

11. The hanger structure of claim 8 wherein the end portion of the hook forming bracket is attached to the base frame.

12. A hanger structure as set forth in claim 8 wherein the base frame has a plurality of bar members with at least a first bar member having first ends and generally parallel to a second bar member, the second bar member having second ends.

13. A hanger structure as set for the in claim 12 wherein the first bar member is connected to the prong side of the base frame.

14. A hanger structure as set for in claim 12 wherein the second bar member is connected to the backside of the base frame.

15. The hanger structure of claim 8 wherein the force distributing strut member has a first end and a second end.

16. The hanger structure of claim 15 wherein the first end of the force distributing strut member attaches to the prong side of the upper portion of the hook forming bracket and the second end attaches to the prong side of the base frame.

17. The hanger structure in claim 8 wherein the hanger structure further includes a gripping member in the form of an inverted "U" shape having a bight portion and spaced leg portions each having an angled intermediate section, a terminal end section, and a prong, the prong extending laterally from the meatside of the base frame.

18. The hanger structure in claim 17 wherein the intermediate portion of the hook forming bracket is connected to the bight portion of the gripping member.

19. The hanger section in claim 8 wherein the second intermediate portion of the force distribution member attaches to the bight portion of the gripping member.

* * * * *